United States Patent
Joo et al.

(10) Patent No.: US 8,964,193 B2
(45) Date of Patent: Feb. 24, 2015

(54) PRINT CONTROLLING TERMINAL APPARATUS, IMAGE FORMING APPARATUS, PRINT CONTROLLING METHOD OF CONTROLLING TERMINAL APPARATUS, AND IMAGE FORMING METHOD OF IMAGE FORMING APPARATUS

(75) Inventors: Jin-myung Joo, Seoul (KR); Seung-hee Lee, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 273 days.

(21) Appl. No.: 13/557,870

(22) Filed: Jul. 25, 2012

(65) Prior Publication Data

US 2013/0100489 A1 Apr. 25, 2013

(30) Foreign Application Priority Data

Oct. 21, 2011 (KR) .................. 10-2011-0108220

(51) Int. Cl.
*G06K 15/00* (2006.01)
*G06F 3/12* (2006.01)

(52) U.S. Cl.
CPC .............. *G06F 3/1219* (2013.01); *G06F 3/126* (2013.01); *G06F 3/1285* (2013.01)
USPC ....... 358/1.13; 358/1.14; 358/1.16; 358/1.17; 399/24; 399/38

(58) Field of Classification Search
CPC ... G06F 3/1218; G06F 3/1219; G06F 3/1285; G06F 3/126; G03G 5/06; G03G 15/553
USPC ................ 358/1.11–1.18, 2.1, 1.9, 400–404; 399/9–32, 107–117
See application file for complete search history.

(56) References Cited

U.S. PATENT DOCUMENTS

2010/0278546 A1* 11/2010 Korfanta ..................... 399/24

FOREIGN PATENT DOCUMENTS

| JP | 2008-23891 | | 2/2008 |
| JP | 2008023891 A | * | 2/2008 |

* cited by examiner

*Primary Examiner* — Chad Dickerson
(74) *Attorney, Agent, or Firm* — Staas & Halsey LLP

(57) ABSTRACT

A print controlling method, an image forming method and a print controlling terminal apparatus are provided. The print controlling method includes receiving a job command to execute a printing job, determining whether accumulative printing is needed based on a ratio of a number of accumulated organic photo conductor (OPC) revolutions to a number of accumulated output pages of the image forming apparatus, if it is determined that the accumulative printing is needed, accumulating and storing data of the printing job, and, if a number of printing pages of entire data accumulated and stored is greater than or equal to a pre-set threshold number of pages, transmitting all the data to the image forming apparatus.

20 Claims, 7 Drawing Sheets

PRINT CONTROLLING TERMINAL APPARATUS, IMAGE FORMING APPARATUS, PRINT CONTROLLING METHOD OF CONTROLLING TERMINAL APPARATUS, AND IMAGE FORMING METHOD OF IMAGE FORMING APPARATUS

CROSS-REFERENCE TO RELATED APPLICATIONS

This application is related to and claims priority to Korean Patent Application No. 10-2011-0108220, filed on Oct. 21, 2011 in the Korean Intellectual Property Office, the disclosure of which is incorporated herein by reference.

BACKGROUND

1. Field

The exemplary embodiments discussed herein relate to a print controlling terminal apparatus, an image forming apparatus, a print controlling method of the print controlling terminal apparatus, and an image forming method of the image forming apparatus, and more particularly, to a print controlling terminal apparatus, an image forming apparatus, a print controlling method of the print controlling terminal apparatus, and an image forming method of the image forming apparatus, which can solve a lifespan problem of an organic photo conductor (OPC) drum in a low job duty environment.

2. Description of the Related Art

An image forming apparatus refers to an apparatus that prints data generated, for example, by a terminal apparatus, such as a computer, on recording paper. Examples of such an image forming apparatus are copiers, printer, facsimile machines, or multifunction peripherals (MFPs) that combine functions of the aforementioned devices in a single device.

In recent years, OPC drums of the MFP in a low job duty printing environment, particularly, color (CMYK) OPC drums of a color MFP, are not able to meet a standard lifespan (for example, a lifespan suggested in a specification). This is a major concern for a customer or a re-seller, for example, who does a business-to-business (B2B) enterprise.

The low job duty recited herein may be one page per job (1PPJ) to four pages per job (4PPJ), for example. However, the range of the low job duty may be broader according to a manufacturer of the image forming apparatus or a performance condition. The PPJ may be defined as a number of printing pages of a printing job. The PPJ may be closely related with the lifespan of the OPC drum. That is, in the low job duty printing environment, there may be a problem in that the standard lifespan of the OPC drum cannot be met. One reason is that the number of revolutions of the OPC drum increases due to the low job duty printing. Accordingly, the lifespan may be sharply shortened in comparison to a case that many pages per a printing job are printed. If the life of the OPC drum has ended as described above, image quality of a formed image may deteriorate.

International and/or domestic resellers that conduct a MFP B2B business at a corporate level may lose faith in clients due to such a lifespan problem of the OPC drum, and may encounter a situation that they could not replace the OPC drum every time that the life of the OPC drum has ended due to a cost problem.

A solution to the above-described problem is required. However, the related-art merely displays a current lifespan of the OPC drum through a state display monitor of the image forming apparatus or informs a user of the lifespan of the OPC drum by performing an e-mail notification function. That is, the related-art does not suggest a solution to the problem that the standard lifespan of the OPC drum is not met in the low job duty printing environment.

SUMMARY

Additional aspects and/or advantages will be set forth in part in the description which follows and, in part, will be apparent from the description, or may be learned by practice of the invention.

One or more exemplary embodiments overcome the above disadvantages and other disadvantages not described above.

One or more exemplary embodiments provide a print controlling terminal apparatus, an image forming apparatus, a print controlling method of the print controlling terminal apparatus, and an image forming method of the image forming apparatus, which can meet a standard lifespan of an organic photo conductor (OPC) drum by determining whether accumulative printing is needed based on ratio of a number of accumulated OPC revolutions to a number of accumulated output pages of the image forming apparatus and performing a printing job according to a result of the determining.

According to an aspect of an exemplary embodiment, a print controlling method is provided of a print controlling terminal apparatus connected to an image forming apparatus, the print controlling method including receiving a job command to execute a printing job, determining whether accumulative printing is needed based on a ratio of a number of accumulated OPC revolutions to a number of accumulated output pages of the image forming apparatus, if it is determined that the accumulative printing is needed, accumulating and storing data of the printing job, and if a number of printing pages of entire data accumulated and stored is greater than or equal to a pre-set threshold number of pages, transmitting the entire data to the image forming apparatus.

The determining may include calculating the ratio of the number of accumulated OPC revolutions to the number of accumulated output pages, and determining whether the accumulative printing is needed by comparing the ratio of the number of accumulated OPC revolutions to the number of accumulated output pages and a pre-set threshold value.

The determining may include, if a number of printing pages of the printing job is greater than or equal to the pre-set threshold number of pages, determining that the accumulative printing is not needed.

The determining may include, if an accumulative printing option is not set, determining that the accumulative printing is not needed.

The print controlling method may further include: displaying a user interface window to set a printing option, and generating data based on the set printing option.

The user interface window may include a first region to select whether an accumulative printing option is set and a second region to select whether use of an accumulative printing function is notified prior to performing the printing job.

The print controlling method may further include if it is determined that the accumulative printing is needed, comparing a number of printing pages of data of the printing job and the pre-set threshold number of pages, if the number of printing pages of the printing job is less than the pre-set threshold number of pages, accumulating and storing the data of the printing job, if the number of printing pages of the printing job is greater than or equal to the pre-set threshold number of pages, determining whether there exists pre-stored data, and, if there exists the pre-stored data, combining the data of the printing job and the pre-stored data and transmitting the combined data to the image forming apparatus, and, if there exists no pre-stored data, transmitting the data of the printing job to the image forming apparatus.

The print controlling method may further include, if it is determined that the accumulative printing is needed, displaying that the accumulative printing is progressed.

The transmitting may include, if a pre-set printing standby time elapses in a state that the number of printing pages of the entire data accumulated and stored is less than the pre-set threshold number of pages, transmitting the entire data to the image forming apparatus.

According to an aspect of an exemplary embodiment, an image forming method is provided of an image forming apparatus, the image forming method including receiving a job command to execute a printing job, determining whether accumulative printing is needed based on a ratio of a number of accumulated OPC revolutions to a number of accumulated output pages of the image forming apparatus, if it is determined that the accumulative printing is needed, accumulating and storing data of the printing job, and, if a number of printing pages of entire data accumulated and stored is greater than or equal to a pre-set threshold number of pages, printing the entire data.

The determining may include calculating the ratio of the number of accumulated OPC revolutions to the number of accumulated output pages, and determining whether the accumulative printing is needed by comparing the ratio of the number of accumulated OPC revolutions to the number of accumulated output pages and a pre-set threshold value.

The determining may include, if a number of printing pages of the printing job is greater than or equal to the pre-set threshold number of pages, determining that the accumulative printing is not needed.

The determining may include, if an accumulative printing option is not set, determining that the accumulative printing is not needed.

The image forming method may further include displaying a user interface window to set a printing option, and the printing may include performing the printing job reflecting the set printing option.

The user interface window may include a first region to select whether an accumulative printing option is set and a second region to select whether use of an accumulative printing function is notified prior to performing the printing job.

The image forming method may further include, if it is determined that the accumulative printing is needed, comparing a number of printing pages of the data of the printing job and the pre-set threshold number of pages, if the number of printing pages of the printing job is less than the pre-set threshold number of pages, accumulating and storing the data of the printing job, if the number of printing pages of the printing job is greater than or equal to the pre-set threshold number of pages, determining whether there exists pre-stored data, and, if there exists the pre-stored data, combining the data of the printing job and the pre-stored data and printing the combined data, and, if there exists no pre-stored data, printing the data of the printing job.

The image forming method may further include, if it is determined that the accumulative printing is needed, displaying that the accumulative printing is progressed.

The printing may include, if a pre-set printing standby time elapses in a state that the number of printing pages of the entire data accumulated and stored is less than the pre-set threshold number of pages, printing the entire data.

The printing job may be at least one of a job transmitted from a print controlling terminal apparatus connected to the image forming apparatus, a job on scan data generated by a scan unit of the image forming apparatus, and a fax reception job received at a fax unit of the image forming apparatus.

According to an aspect of an exemplary embodiment, a print controlling terminal apparatus is provided connected to an image forming apparatus, the print controlling terminal apparatus including: a user interface unit which receives a job command to execute a printing job, a determination unit which determines whether accumulative printing is needed based on a ratio of a number of accumulated OPC revolutions to a number of accumulated output pages of the image forming apparatus, a storage unit which, if it is determined that the accumulative printing is needed, stores data of the printing job, and a communication interface unit which, if a number of printing pages of entire data accumulated and stored is greater than or equal to a pre-set threshold number of pages, transmits the entire data to the image forming apparatus.

The determination unit may calculate the ratio of the number of accumulated OPC revolutions to the number of accumulated output pages, and may determine whether the accumulative printing is needed by comparing the ratio of the number of accumulated OPC revolutions to the number of accumulated output pages and a pre-set threshold value.

If a number of printing pages of the printing job is greater than or equal to the pre-set threshold number of pages, the determination unit may determine that the accumulative printing is not needed.

If an accumulative printing option is not set, the determination unit may determine that the accumulative printing is not needed.

The user interface unit may display a user interface window to set a printing option, and the print controlling terminal apparatus may further include a printer driver unit which generates data based on the set printing option.

The user interface window may include a first region to select whether an accumulative printing option is set and a second region to select whether use of an accumulative printing function is notified prior to performing the printing job.

If it is determined that the accumulative printing is needed, the determination unit may compare a number of printing pages of the data of the printing job and the pre-set threshold number of pages, and, if the number of printing pages of the printing job is greater than or equal to the pre-set threshold number of pages, the determination unit may determine whether there exists pre-stored data. If there exists the pre-stored data, the communication interface unit may combine the data of the printing job and the pre-stored data and transmit the combined data to the image forming apparatus, and, if there exists no pre-stored data, the communication interface unit may transmit the data of the printing job to the image forming apparatus. If the number of printing pages is less than the pre-set threshold number of pages, the storage unit may accumulate and store the data of the printing job.

If it is determined that the accumulative printing is needed, the user interface unit may display that the accumulative printing is progressed.

If a pre-set printing standby time elapses in a state that the number of printing pages of the entire data accumulated and stored is less than the pre-set threshold number of pages, the communication interface unit may transmit the entire data to the image forming apparatus.

According to an aspect of an exemplary embodiment, an image forming apparatus is provided including a user interface unit which receives a job command to execute a printing job, a determination unit which determines whether accumulative printing is needed based on a ratio of a number of accumulated OPC revolutions to a number of accumulated output pages of the image forming apparatus, a storage unit which, if it is determined that the accumulative printing is needed, stores data of the printing job, and an image forming unit which, if a number of printing pages of entire data accumulated and stored is greater than or equal to a pre-set threshold number of pages, prints the entire data.

The determination unit may calculate the ratio of the number of accumulated OPC revolutions to the number of accumulated output pages, and may determine whether the accumulative printing is needed by comparing the ratio of the number of accumulated OPC revolutions to the number of accumulated output pages and a pre-set threshold value.

If a number of printing pages of the printing job is greater than or equal to the pre-set threshold number of pages, the determination unit may determine that the accumulative printing is not needed.

If an accumulative printing option is not set, the determination unit may determine that the accumulative printing is not needed.

The image forming apparatus may further include a user interface unit which displays a user interface window to set a printing option, and the image forming unit may perform the printing job reflecting the set printing option.

The user interface window may include a first region to select whether an accumulative printing option is set and a second region to select whether use of an accumulative printing function is notified prior to performing the printing job.

If it is determined that the accumulative printing is needed, the determination unit may compare a number of printing pages of the data of the printing job and the pre-set threshold number of pages, and, if the number of printing pages of the printing job is greater than or equal to the pre-set threshold number of pages, the determination unit may determine whether there exists pre-stored data. If there exists the pre-stored data, the image forming unit may combine the data of the printing job and the pre-stored data and print the combined data, and, if there exists no pre-stored data, the image forming unit may print the data of the printing job. If the number of printing pages of the printing job is less than the pre-set threshold number of pages, the storage unit may accumulate and store the data of the printing job.

If it is determined that the accumulative printing is needed, the user interface unit may display that the accumulative printing is progressed.

If a pre-set printing standby time elapses in a state that the number of printing pages of the entire data accumulated and stored is less than the pre-set threshold number of pages, the image forming unit may print the entire data.

According to an aspect of an exemplary embodiment, there is provided a recording medium on which a program code to perform a print controlling method of a print controlling terminal apparatus connected to an image forming apparatus is recorded, the print controlling method including: receiving a job command to execute a printing job, determining whether accumulative printing is needed based on a ratio of a number of accumulated OPC revolutions to a number of accumulated output pages of the image forming apparatus, if it is determined that the accumulative printing is needed, accumulating and storing data of the printing job, and if a number of printing pages of entire data accumulated and stored is greater than or equal to a pre-set threshold number of pages, transmitting the entire data to the image forming apparatus.

According to an aspect of an exemplary embodiment, there is provided a non-transitory recording medium on which a program code to perform an image forming method of an image forming apparatus is recorded, the image forming method including: receiving a job command to execute a printing job, determining whether accumulative printing is needed based on a ratio of a number of accumulated OPC revolutions to a number of accumulated output pages of the image forming apparatus, if it is determined that the accumulative printing is needed, storing the printing job, and if a number of printing pages of data of the printing job is greater than or equal to a pre-set threshold number of pages, printing the data of the printing job.

BRIEF DESCRIPTION OF THE DRAWINGS

The above and/or other aspects will be more apparent by describing in detail exemplary embodiments, with reference to the accompanying drawings, in which.

DETAILED DESCRIPTION

Figure 1:
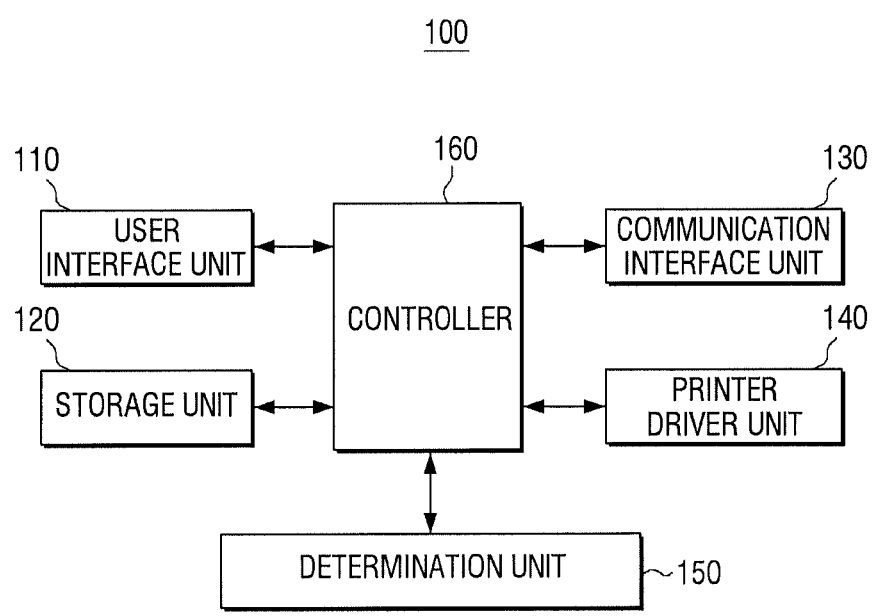
FIG. 1 illustrates a print controlling terminal apparatus according to an exemplary embodiment.

Reference will now be made in detail to the embodiments, examples of which are illustrated in the accompanying drawings, wherein like reference numerals refer to the like elements throughout. The embodiments are described below to explain the present invention by referring to the figures.

Hereinafter, exemplary embodiments will be described in greater detail with reference to the accompanying drawings.

In the following description, same reference numerals are used for similar elements when they are depicted in different drawings. The matters defined in the description, such as detailed construction and elements, are provided to assist in a comprehensive understanding of exemplary embodiments.

FIG. 1 illustrates a print controlling terminal apparatus according to an exemplary embodiment. Referring to FIG. 1, a print controlling terminal apparatus 100 includes a user interface unit 110, a storage unit 120, a communication interface unit 130, a printer driver unit 140, a determination unit 150, and a controller 160.

The print controlling terminal apparatus 100 may be a personal computer, a personal digital assistant (PDA), a lap top computer, or a mobile terminal (for example, a mobile device).

The user interface unit 110 may allow a user to set or select various functions supported by the print controlling terminal apparatus 100.

The user interface unit 110 may receive a job command to execute a printing job.

The user interface unit 110 may display a user interface (UI) window to set a printing option. The UI window may include a first region to select whether to set an accumulative printing option and a second region to select whether to notify use of an accumulative printing function prior to performing a printing job.

If it is determined that accumulative printing is needed, the user interface unit 110 may display that the accumulative printing is progressing.

The user interface unit 110 may a device implementing input and output simultaneously such as a touch pad and/or may be a combination of an input device such as a mouse and a keyboard and a display device such as a cathode-ray tube (CRT) monitor, a liquid crystal display (LCD) monitor, and a light emitting diode (LED).

The storage unit 120 stores various programs and data necessary for driving the print controlling terminal apparatus 100.

The storage unit 120 may store data of the printing job if it is determined that the accumulative printing is needed as a result of determination by the determination unit 150. That is, if it is determined that the accumulative printing is needed, the determination unit 120 may compare a number of printing pages of data of the printing job and a pre-set threshold number of pages. If the number of printing pages is less than the pre-set threshold number of pages, the storage unit 120 may accumulate and store the data of the printing job.

The storage unit 220 may be an embedded storage element, such as a random access memory (RAM), a flash memory, a read only memory (ROM), an erasable programmable ROM (EPROM), an electronically erasable and programmable ROM (EEPROM), a register, a hard disk, a removable disk, and a memory card, and/or a removable storage element such as a universal serial bus (USB) memory or a CD-ROM.

The communication interface unit 130 connects the print controlling terminal apparatus 100 to an image forming apparatus 200.

The communication interface unit 130 may transmit the generated data to the image forming apparatus 200 through the printer driver unit 150.

If a number of printing pages of entire data accumulated and stored is greater than or equal to the pre-set threshold number of pages, the communication interface unit 130 may transmit the entire data to the image forming apparatus 200.

If a pre-set printing standby time elapses in a state that the number of printing pages of the data accumulated and stored is less than the pre-set threshold number of pages, the communication interface unit 130 may transmit the entire data to the image forming apparatus 200.

The communication interface 130 may access the image forming apparatus 200 in a wireless or wired manner through a local area network (LAN) and the internet, and may also access the image forming apparatus 200 through a USB port.

The printer driver unit 140 generates data based on a set printing option.

The printer driver unit 140 may convert the printing option and the data which are set through the user interface unit 110 into a printer language that can be emulated by the image forming apparatus 200.

The printer language may be a printer control language (PCL) proposed by Hewlett-Packard Company, a PostScript (PS) proposed by Adobe Systems Incorporated, or a GDI language that converts one page of data into bitmap data, for example. The GDI language may be a Samsung Printer Language (SPL) supported by Samsung Electronics Co., Ltd., for example.

The determination unit 150 determines a flow of an overall operation of the print controlling terminal apparatus 100.

The determination unit 150 may determine whether accumulative printing is needed based on a ratio of a number of accumulated organic photo conductor (OPC) revolutions to a number of accumulated output pages of the image forming apparatus 200. That is, the determination unit 150 calculates the ratio of the number of accumulated OPC revolutions to the number of accumulated output pages, and compares the ratio of the number of accumulated OPC revolutions to the number of accumulated output pages and a pre-set threshold value, thereby determining whether the accumulative printing is needed.

The pre-set threshold value refers to a ratio of a number of accumulated OPC revolutions to a number of accumulated output pages that meets a standard lifespan of an OPC drum. The ratio of the number of accumulated OPC revolutions to the number of accumulated output pages may be expressed by a revolution per page (RPP).

That is, the RPP may be expressed by the following equation 1:

$$RPP = \text{number of accumulated OPC revolutions} / \text{number of accumulated output pages of the OPC} \quad \text{(Equation 1)}$$

The standard lifespan of the OPC drum is a lifespan of the OPC drum that is designed considering a driving condition of the OPC drum such as an auto color regulation (ACR). For example, the standard lifespan may indicate how many pages could be printed at what degree of PPJ the OPC drum is driven.

If the ratio of the number of accumulated OPC revolutions to the number of accumulated output pages is greater than or equal to the pre-set threshold value, the determination unit 150 determines that accumulative printing is needed, and, if the ratio of the number of accumulated OPC revolutions to the number of accumulated output pages is less than the pre-set threshold value, the determination unit 150 determines that the accumulative printing is not needed. An exemplary case in which the pre-set threshold value is 10 will be explained below, for example.

If the number of accumulated OPC revolutions of the OPC drum is, for example, 300,000 and the number of accumulated output pages is, for example, 10,000, the RPP is 30 (REV/PAGE). Thus, a number of revolutions of the OPC drum that has been accumulatively used up to the present time is greater than the pre-set threshold value. In this case, the determination unit 150 determines that the accumulative printing is needed.

If the number of accumulated OPC revolutions of the OPC drum is, for example, 90,000 and the number of accumulated output pages of the OPC drum is, for example, 10,000, the RPP is 9 (REV/PAGE). Thus, a number of revolutions of the OPC drum that has been accumulatively used up to the present time is less than the pre-set threshold value. In this case, the determination unit 150 determines that the accumulative printing is not needed.

A reason why the standard lifespan of the OPC drum may not be met is that the number of revolutions of the OPC drum increases due to low job duty printing.

The print controlling terminal apparatus 100 according to the exemplary embodiment determines whether to perform the accumulative printing according to the current environment, using the number of accumulated revolutions of the OPC drum accumulatively used up to the present time and the number of accumulated output pages of the OPC drum, and thus can meet the standard lifespan of the OPC drum.

If it is determined that the accumulative printing is needed as a result of the determining by the determination unit 150, the determination unit 150 may compare the number of printing pages of the printing job and the threshold number of pages. The pre-set threshold number of pages corresponds to the pre-set threshold value and thus a paper per job (PPJ) that meets the standard lifespan of the OPC drum. That is, the pre-set threshold value and the pre-set threshold number of pages are values that meet the standard lifespan of the OPC drum. The pre-set threshold number of pages corresponding to the pre-set threshold value of 10 is 4PPJ, and an exemplary case in which the number of printing pages of the printing job is 1PPJ will be explained below for example.

If the determination unit 150 determines that the accumulative printing is needed, the determination unit 150 compares the number of printing pages of the printing job and the pre-set threshold number of pages. In the above example, the number of printing pages of the printing job (1PPJ) is less than the pre-set threshold number of pages (4PPJ). If the printing job is performed by the OPC drum at less than 4PPJ, and the number of revolutions of the OPC drum increases and the lifespan may be sharply shortened compared to a case in which many pages per a printing job are printed. That is, the determination unit 150 may compare the number of printing pages of the printing job input through the user interface unit 110 and the pre-set threshold number of pages.

If it is determined that the accumulative printing is needed, and if the number of printing pages of the printing job is less than the threshold number of pages, the controller 160 may control an accumulation and store the data of the printing job in the storage unit 120. For example, an exemplary case in which the pre-set threshold number of pages is 4PPJ will be explained. If the number of printing pages is 1PPJ, the determination unit 150 determines that the number of printing pages of the printing job is less than the threshold number of pages and thus the controller 160 stores the data of the printing job in the storage unit 120. If there exists pre-stored data, the data may be accumulated in the pre-stored data and stored. That is, if the number of printing pages of a previously performed printing job is 1PPJ, data of the previously performed printing job may also be stored in the storage unit 120. In this case, the data of the printing job performed after the previously performed printing job may be accumulated and stored. If there exists no pre-stored data, only the data is stored.

If it is determined that the accumulative printing is needed, and if the determination unit 150 determines that the number of printing pages of the entire data accumulated and stored is greater than or equal to the threshold number of pages, the controller 160 may control the communication interface unit 130 to transmit the entire data to the image forming apparatus 200. For example, if the number of printing pages of the previously performed printing job is 2PPJ and the number of printing pages of the printing job performed after the previously performed printing job is 2PPJ, the number of printing pages of the entire data accumulated and stored is greater than or equal to the threshold number of printing pages, 4PPJ. Therefore, the controller 160 controls to transmit the entire data to the image forming apparatus 200 so that the data is printed.

If it is determined that the accumulative printing is needed, and if the determination unit 150 determines that the number of printing pages of the printing job is greater than or equal to the threshold number of pages, the determination unit 150 determines whether there exists pre-stored data in the storage unit 220, and, if there exists pre-stored data, the controller 160 combines the data of the printing job and the pre-stored data and transmits the combined data to the image forming apparatus 200, so that the data can be printed. If there exists no pre-stored data, the controller 160 transmits the data of the printing job to the image forming apparatus 200 so that the data can be printed. For example, the case in which the pre-set threshold number of pages is 4PPJ will be explained. If the number of printing pages of the printing job is 4PPJ, the controller 160 determines whether there exists pre-stored data. If there exists pre-stored data, the controller 160 controls to combine the data of the printing job and the pre-stored data and transmit the combined data to the image forming apparatus 200, so that the data can be printed. That is, if the number of printing pages of the previously performed printing job is 2PPJ, the controller 160 controls to accumulate the data in the data of the previously performed printing job and transmit the data of 6PPJ to the image forming apparatus 200 so that the data can be printed.

If it is determined that the accumulative printing is needed, and if the determination unit 150 determines that there exists no pre-stored data, the controller 160 may control a transmitting of the data of the printing job to the image forming apparatus 200 so that the data can be printed. That is, if the number of printing pages of the printing job is 4PPJ and there exists no pre-stored data, the controller 150 may control the transmitting the data of 4PPJ to the image forming apparatus 200 so that the data can be printed.

Prior to determining whether the accumulative printing is needed, the determination unit 150 may compare the number of printing pages of the printing job and the pre-set threshold number of pages. If the number of printing pages of the printing job is greater than or equal to the pre-set threshold number of pages, it is determined that the accumulative printing is not needed.

If an accumulative printing option is not set using the user interface window on the UI window, the determination unit 150 may determine that the accumulative printing is not needed.

The accumulative printing option may be an option to perform a printing job according to a result of using the pre-set threshold value and the pre-set threshold number of pages in order to meet the standard lifespan of the OPC drum.

The pre-set threshold value and the pre-set threshold number of pages may be stored in the storage unit 120 in the form of a lookup table. Accordingly, the determination unit 150 may determine whether to perform the accumulative printing operation by comparing values stored in the storage unit 120.

The standard lifespan of the OPC drum, the pre-set threshold value, and the pre-set threshold number of pages may be differently set according to a product type or a manufacturer of the OPC drum.

The controller 160 controls overall operations of the print controlling terminal apparatus 100. The controller 160 may control the user interface unit 110, the storage unit 120, the communication interface unit 130, the printer driver unit 140, and the determination unit 150.

If the second region to select whether to notify the use of the accumulative printing function is selected using the user interface unit 110 on the UI window prior to performing the printing job, the controller 160 may control the user interface unit 110 to display a confirmation window to confirm that the accumulative printing function will be used prior to performing the printing job. If the user does not select the accumulative printing function through the user interface unit 110, the controller 160 may control to transmit the data of the printing job to the image forming apparatus 200 so that the data can be printed. If the user selects the accumulative printing function through the user interface unit 110, the controller 160 may control the determination unit 150 to perform the above-described operation.

The controller 160 may include a CPU, a ROM in which a control program is stored, and a RAM in which input data is memorized or which is used as a job-related memory area. The CPU, the ROM, and the RAM may be connected to one another through an internal bus.

The determination unit 150 may be a separate element from the controller 160. However, according to an exemplary embodiment the controller 160 may perform all of the functions of the determination unit 150.

The print controlling terminal apparatus according to the exemplary embodiment determines whether the accumulative printing is needed based on the ratio of the number of accumulated OPC revolutions to the number of accumulated output pages of the image forming apparatus 200, and performs the printing job according to the result of the determining, thereby meeting the standard lifespan of the OPC drum.

By providing the UI to set the accumulative printing option, user's convenience in setting options can be improved.

Figure 2:
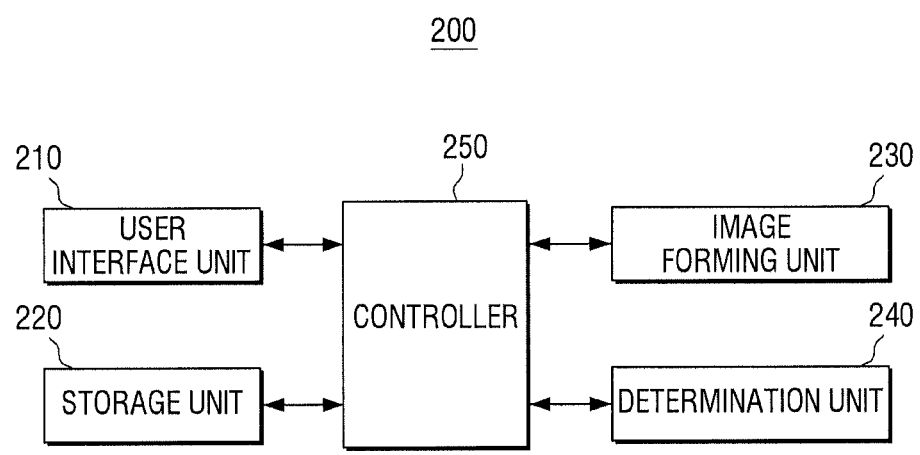
FIG. 2 illustrates an image forming apparatus according to an exemplary embodiment.

FIG. 2 illustrates an image forming apparatus according to an exemplary embodiment. Referring to FIG. 2, an image forming apparatus 200 includes a user interface unit 210, a storage unit 220, a job image forming unit 230, a determination unit 240, and a controller 250. The image forming apparatus 200 refers to an apparatus that prints data generated by a print controlling terminal apparatus such as a computer on recording paper. Examples of such an image forming apparatus are copiers, printers, facsimile machines, or MFPs complexly realizing the functions of the aforementioned devices in a single device.

The user interface unit 210 may allow a user to set or select various functions supported by the image forming apparatus 200.

The user interface unit 210 may receive a job command to execute a printing job.

The user interface unit 210 may display a user interface (UI) window to set a printing option. The UI window may include a first region to select whether to set an accumulative printing option and a second region to select whether to notify use of an accumulative printing function prior to performing a printing job.

If it is determined that accumulative printing is needed, the user interface unit 210 may display that accumulative printing is progressed.

An exemplary embodiment of a user interface unit 210 may be a device implementing input and output simultaneously such as a touch pad or may be a combination of an input device such as a mouse or a keyboard and a display device such as a CRT monitor, an LCD monitor, and an LED.

The storage unit 220 may store various programs and data necessary for driving the image forming apparatus 200.

The storage unit 220 may store data of the printing job, if the determination unit 240 determines that the accumulative printing is needed. That is, if the determination unit 240 determines that the accumulative printing is needed, the determination unit 240 compares a number of printing pages of the data of the printing job and a pre-set threshold number of pages. If the number of printing pages is less than the pre-set threshold number of pages, the storage unit 220 may accumulate and store the data of the printing job.

An exemplary embodiment of the storage unit 220 may be an embedded storage element, such as a RAM, a flash memory, a ROM, an EPROM, an EEPROM, a register, a hard disk, a removable disk, and a memory card, and/or a removable storage element such as a USB memory and a CD-ROM.

The image forming unit 230 may form an image on paper. The image forming unit 230 may perform the printing job according to a result of determining by the determination unit 240 under control of the controller 250.

The determination unit 240 determines a flow of an overall operation of the image forming apparatus 200.

The determination unit 240 may determine whether the accumulative printing is needed based on a ratio of a number of accumulated OPC revolutions to a number of accumulated output pages of the image forming apparatus 200. That is, the determination unit 240 calculates the ratio of the number of accumulated OPC revolutions to the number of accumulated output pages and compares the ratio of the number of accumulated OPC revolutions to the number of accumulated output pages and a pre-set threshold value, thereby determining whether the accumulative printing is needed.

That is, if the ratio of the number of accumulated OPC revolutions to the number of accumulated output pages is greater than or equal to the pre-set threshold value, the determination unit 240 determines that the accumulative printing is needed, and, if the ratio of the number of accumulated OPC revolutions to the number of accumulated output pages is less than the pre-set threshold value, the determination unit 240 may determine that the accumulative printing is not needed.

If the determination unit 240 determines that the accumulative printing is needed, the determination unit 240 may compare a number of printing pages of the printing job and a pre-set threshold number of pages.

If it is determined that the accumulative printing is needed, and if the determination unit 240 determines that the number of printing pages of the printing job is less than the threshold number of pages, the controller 250 may control an accumulation and store the data of the printing job in the storage unit 220.

If there exists pre-stored data, the data is accumulated in the pre-stored data and stored, and, if there exists no pre-stored data, only the data is stored.

If it is determined that the accumulative printing is needed, an, if the determination unit 240 determines that a number of printing pages of entire data accumulated and stored is greater than or equal to the threshold number of pages, the controller 250 may control the image forming unit 230 to print the entire data.

If it is determined that the accumulative printing is needed, and if the determination unit 240 determines that the number of printing pages of the printing job is greater than or equal to the threshold number of pages, the determination unit 240 determines whether there exists pre-stored data in the storage unit 220. If there exists the pre-stored data, the controller 250 may control the image forming unit 230 to combine the data of the printing job and the pre-stored data and print the data, and, if there exists no pre-stored data, the controller 250 may control the image forming unit 230 to print the data of the printing job.

Prior to determining whether the accumulative printing is needed, the determination unit 240 may compare the number of printing pages of the printing job and the pre-set threshold number of pages. If the number of printing pages of the printing job is greater than or equal to the pre-set threshold number of pages, the determination unit 240 may determine that the accumulative printing is not needed. The controller 250 may control the image forming unit 230 to print the data.

If an accumulative printing option is not set using the user interface unit 210 on the UI window, the determination unit 240 may determine that the accumulative printing is not needed.

The pre-set threshold value and the pre-set threshold number of pages may be stored in the storage unit 220 in the form of a lookup table. Accordingly, the determination unit 240 may determine whether to perform the accumulative printing operation by comparing values stored in the storage unit 220.

The standard lifespan of the OPC drum, the pre-set threshold value, and the pre-set threshold number of pages may be differently set according to a product type or a manufacturer of the OPC drum.

The controller 250 controls overall functions of the image forming apparatus 200. The controller 250 may control the user interface unit 210, the storage unit 220, the image forming unit 230, and the determination unit 240.

The controller 250 may include a CPU, a ROM in which a control program is stored, and a RAM in which input data is memorized or which is used as a job-related memory area. The CPU, the ROM, and the RAM may be connected to one another through an internal bus.

The determination unit 240 may be a separate element from the controller 250, and/or the controller 250 may perform all of the functions of the determination unit 240.

The image forming apparatus 200 according to the exemplary embodiment receives the job command to execute the printing job from the user interface unit 210. However, this should not be considered as limiting. The job may be a job transmitted from a print controlling terminal apparatus 100 connected to the image forming apparatus 200. In this case, the image forming apparatus 200 may compare the number of printing pages of data received from the print controlling terminal apparatus 100 and the pre-set threshold number of pages, and, if the number of printing pages of the data is less than the pre-set threshold number of pages, the data may be accumulated and stored in the storage unit 220 of the image forming apparatus 200.

The job may be a job on scan data generated by a scan unit of the image forming apparatus 200 or may be a fax reception job received at a fax unit of the image forming apparatus 200.

Figure 3:
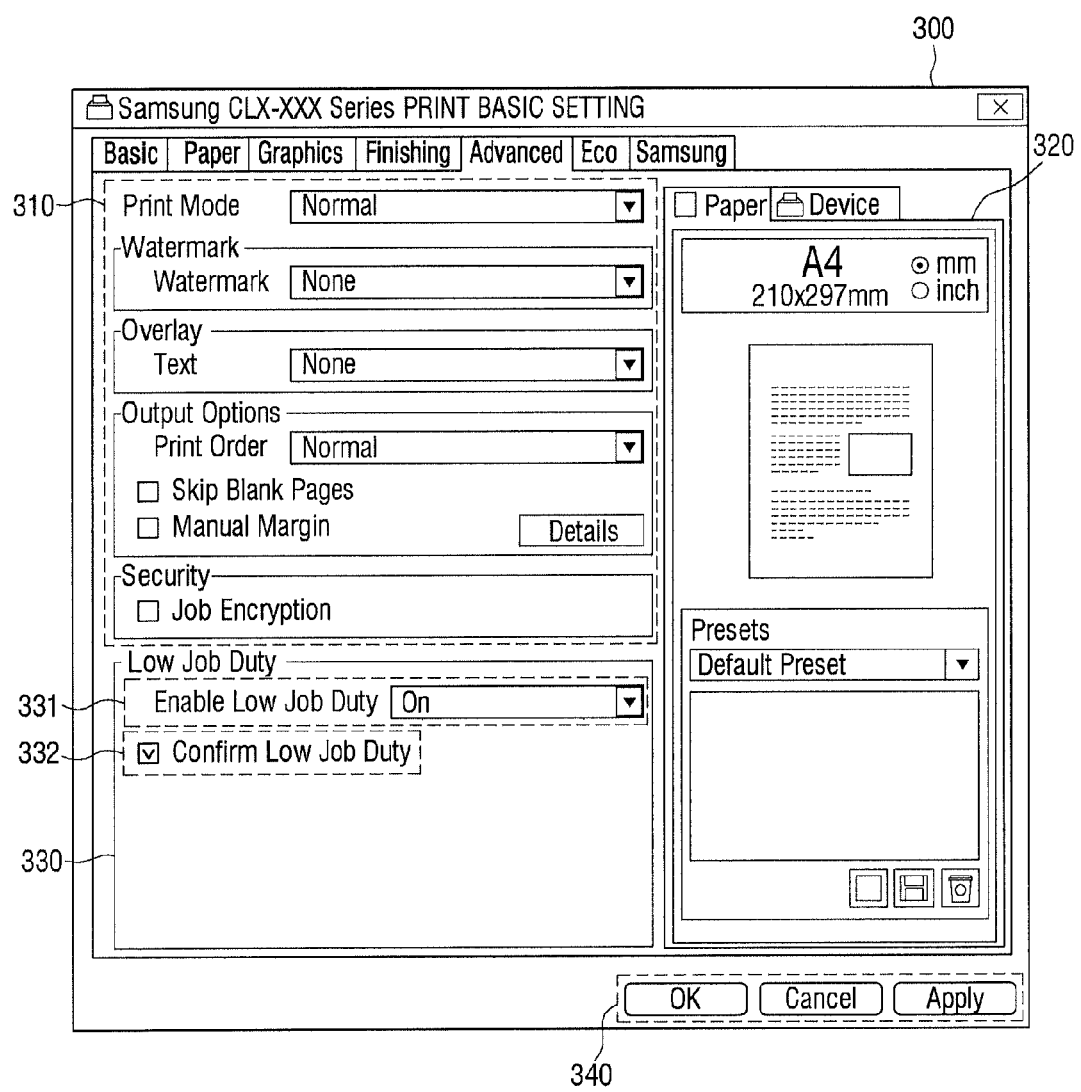
FIG. 3 illustrates an exemplary user interface (UI) window to set a printing option.

FIG. 3 illustrates a UI window to set a printing option. Referring to FIG. 3, a UI window includes a printing option setting region 310, a preview region 320, an accumulative printing option setting-related region 330, and a selection region 340.

The accumulative printing option setting-related region 330 may include a first region 331 to select whether to set an accumulative printing option and a second region 332 to select whether to notify use of an accumulative printing function prior to performing a printing job.

If the accumulative printing option is not set on the first region 331 (OFF), the controller 250 may control to directly print the data of the printing job according to the job command without determining the low job duty by the determination unit 240.

If the accumulative printing option is set on the first region 331 (ON), the controller 250 may perform the printing job according to a result of determining the low job duty by the determination unit 240.

If the second region 332 is selected, the controller 250 may control the user interface unit 210 to display a confirmation UI window to confirm whether the accumulative printing function will be used prior to performing the printing job.

By providing the UI window to select whether to set the accumulative printing option or not, user's convenience in setting the option can be improved.

Figure 4:
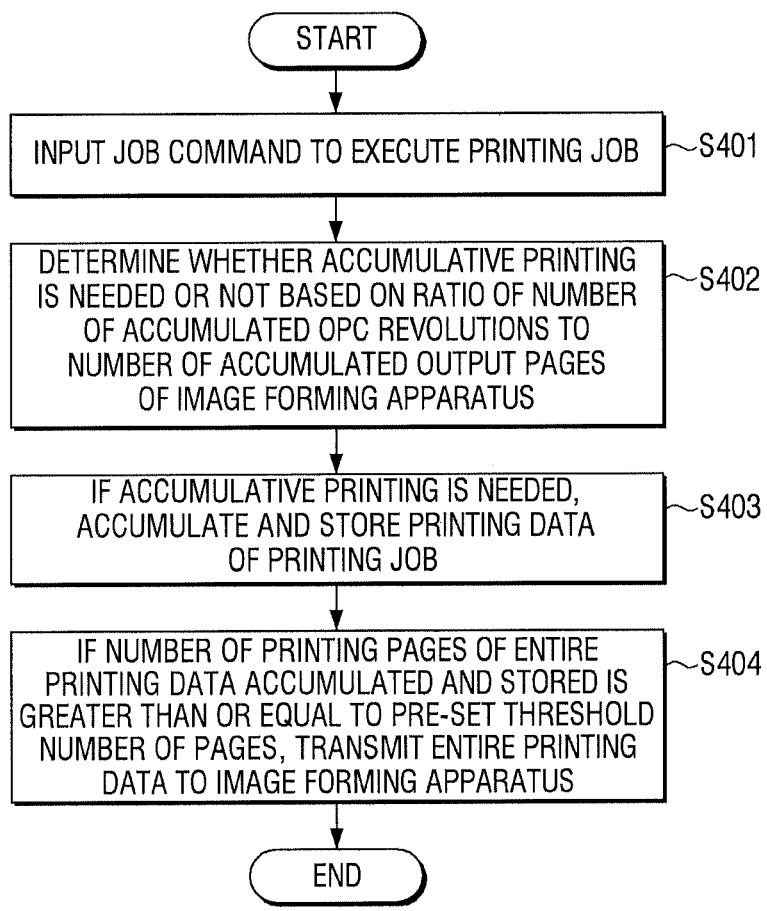
FIG. 4 illustrates a print controlling method of a print controlling terminal apparatus according to an exemplary embodiment.

FIG. 4 illustrates a print controlling method of a print controlling terminal apparatus according to an exemplary embodiment. Referring to FIG. 4, a job command to execute a printing job is received (S401). According to an exemplary embodiment, it is determined whether accumulative printing is needed based on a ratio of a number of accumulated OPC revolutions to a number of accumulated output pages of the image forming apparatus 200 (S402). If it is determined that the accumulative printing is needed, data of the received printing job is accumulated and stored (S403). If a number of printing pages of entire data accumulated and stored is greater than or equal to a pre-set threshold number of pages, the entire data is transmitted to the image forming apparatus 200 (S404).

Figure 5:
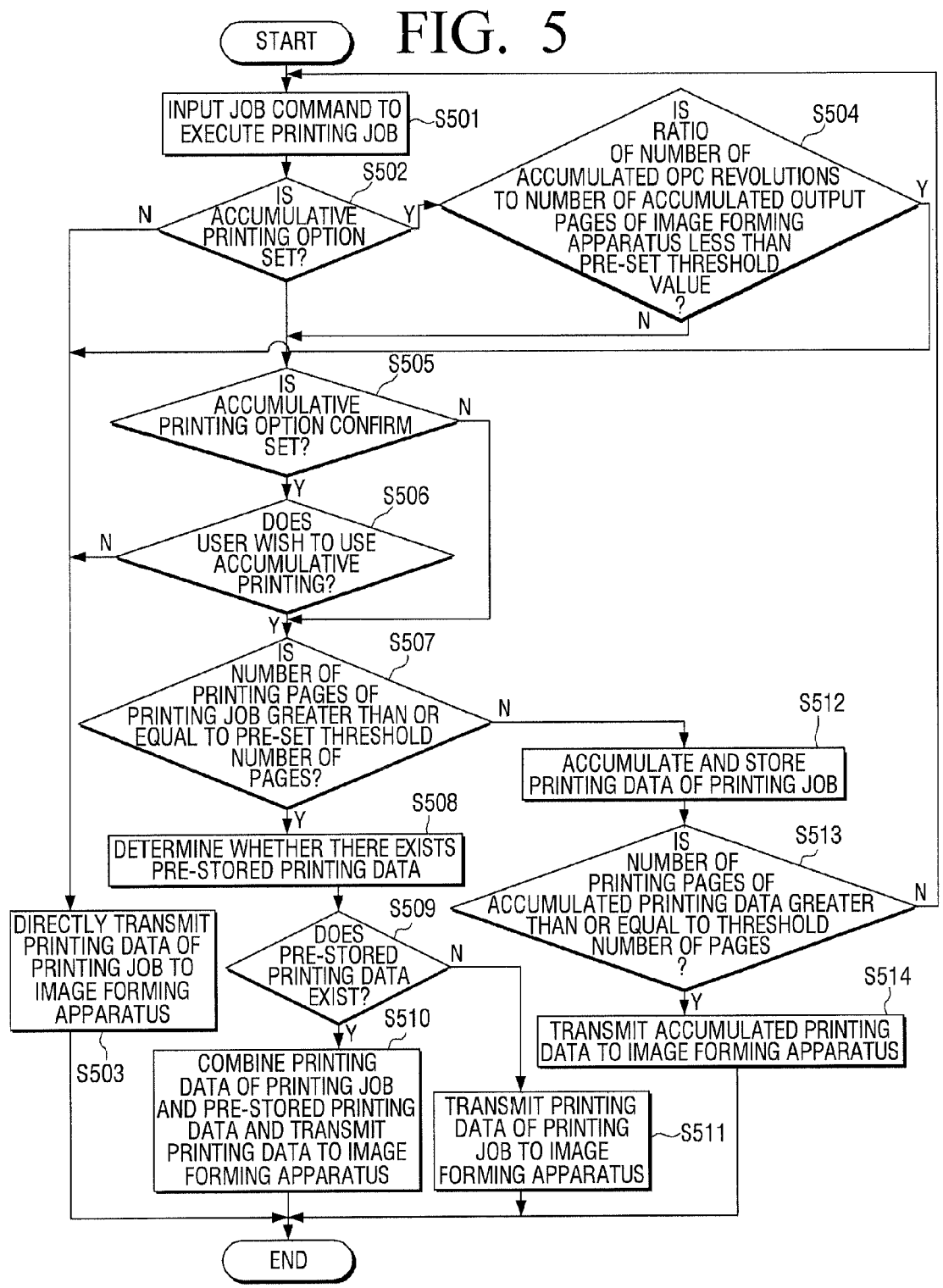
FIG. 5 illustrates an exemplary print controlling method of a print controlling terminal apparatus.

FIG. 5 illustrates a print controlling method of the print controlling terminal apparatus. Referring to FIG. 5, a job command to execute a printing job is received (S501).

According to an exemplary embodiment it is determined whether an accumulative printing option is set. If the accumulative printing option is not set (S502: N), data of the printing job is directly transmitted to the image forming apparatus 200 according to the input job command (S503).

If the accumulative printing option is set (S502: Y), it is determined whether a ratio of a number of accumulated OPC revolutions to a number of accumulated output pages of the image forming apparatus 200 is less than a pre-set threshold value (S504). If the ratio of the number of accumulated OPC revolutions to the number of accumulated output pages of the image forming apparatus 200 is less than the pre-set threshold value (S504: Y), the data of the printing job is directly transmitted to the image forming apparatus 200 according to the input job command (S503).

If the ratio of the number of accumulated OPC revolutions to the number of accumulated output pages of the image forming apparatus 200 is greater than or equal to the pre-set threshold value (S504: N), it is determined whether an accumulative printing option confirm is set. If the accumulative printing option confirm is set (S505: Y), a UI window to ask whether an accumulative printing function is to be used is displayed for a user. If the user does not wish to use the accumulative printing function (S506: N), the data of the printing job is directly transmitted to the image forming apparatus 200 (S503). If the user wishes to use the accumulative printing function (S506: Y), it is determined whether a number of printing pages of the printing job is greater than or equal to a pre-set threshold number of pages (S507).

If the accumulative printing option confirm is not set (S505: N), the UI widow to ask whether the accumulative printing function is to be used is not displayed for the user and it is determined whether the number of printing pages of the printing job is greater than or equal to the pre-set threshold number of pages (S507).

If the number of printing pages of the printing job is greater than or equal to the pre-set threshold number of pages (S507: Y), it is determined whether there exists pre-stored data (S508). If there exists the pre-stored data (S509: Y), the data of the printing job and the pre-stored data are combined with each other and the combined data is transmitted to the image forming apparatus 200 (S510). If there exists no pre-stored data (S509: N), the data of the printing job is transmitted to the image forming apparatus (S511).

If the number of printing pages of the printing job is less than the pre-set threshold number of pages (S507: N), the data is accumulated and stored (S512). It may be determined whether the number of printing pages of the accumulated data is greater than or equal to the threshold number of pages (S513). If the number of printing pages of the accumulated data is greater than or equal to the threshold number of pages (S513: Y), the accumulated data is transmitted to the image forming apparatus (S513). If the number of printing pages of the accumulated data is less than the threshold number of pages (S513: N), the print controlling terminal apparatus 100 waits for a job command to execute a new printing job and repeats the above-described operations.

Figure 6:
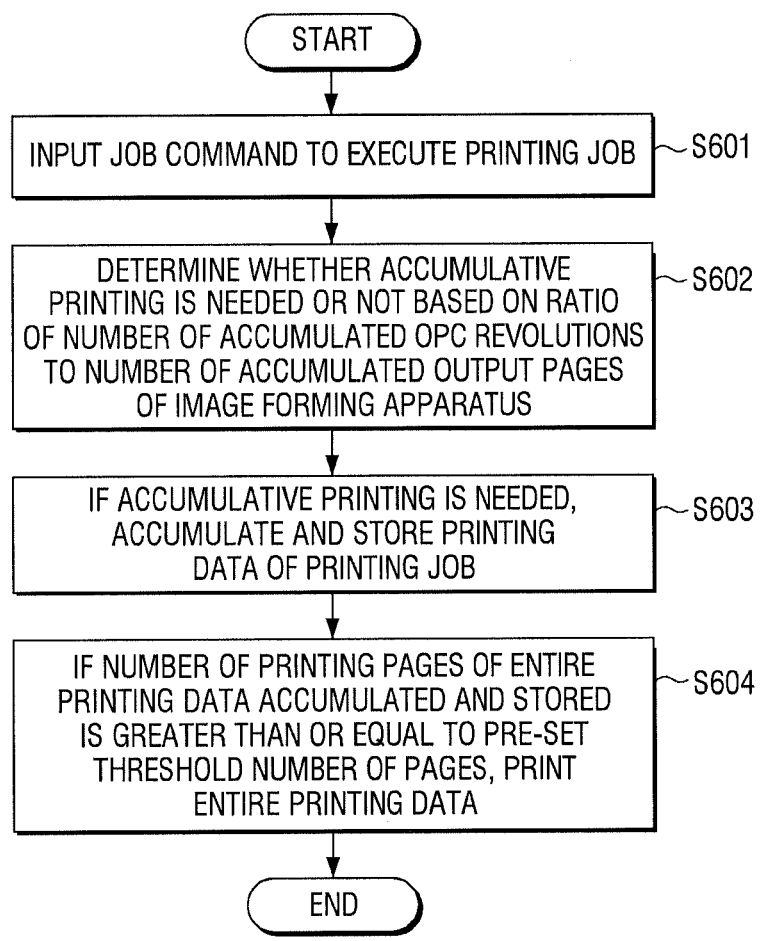
FIG. 6 illustrates an image forming method of an image forming apparatus according to an exemplary embodiment.

FIG. 6 illustrates an image forming method of an image forming apparatus according to an exemplary embodiment. Referring to FIG. 6, a job command to execute a printing job is received (S601). It may be determined whether accumulative printing is needed based on a ratio of a number of accumulated OPC revolutions to a number of accumulated output pages of the image forming apparatus 200 (S602). If it is determined that the accumulative printing is needed, data of the received printing job is accumulated and stored (S603). If a number of printing pages of entire data accumulated and stored is greater than or equal to a threshold number of pages, the entire data is printed (S604).

Figure 7:
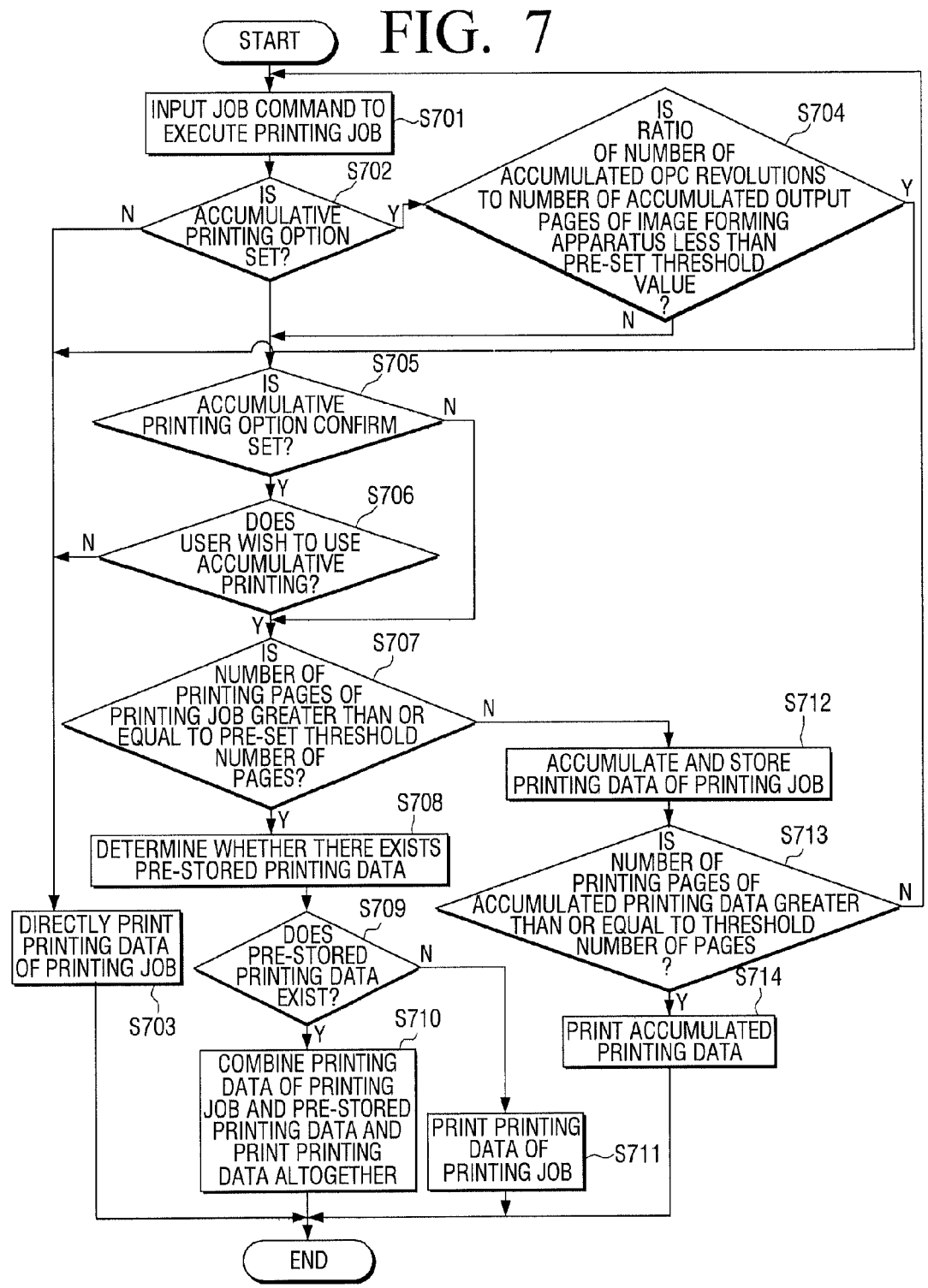
FIG. 7 illustrates an image forming method of an image forming apparatus.

FIG. 7 illustrates the image forming method of the image forming apparatus. Referring to FIG. 7, a job command to execute a printing job is received (S701).

It is determined whether an accumulative printing option is set. If the accumulative printing option is not set (S702: N), the printing job is performed according to data of the printing job (S703).

If the accumulative printing option is set (S702: Y), it is determined whether a ratio of a number of accumulated OPC revolutions to a number of accumulated output pages of the image forming apparatus 200 is less than a pre-set threshold value (S704). If the ratio of the number of accumulated OPC revolutions to the number of accumulated output pages of the image forming apparatus 200 is less than the pre-set threshold value (S704:Y), the data of the printing job is directly printed by the image forming apparatus 200 according to the input job command (S703).

If the ratio of the number of accumulated OPC revolutions to the number of accumulated output pages of the image forming apparatus 200 is greater than or equal to the pre-set threshold value (S704: N), it is determined whether an accumulative printing option confirm is set. If the accumulative printing option confirm is set (S705: Y), a UI window to ask whether an accumulative printing function is to be used is displayed for the user. If the user does not wish to use the accumulative printing (S706: N), the printing job is performed according to the data of the printing job (S703). If the user wishes to use the accumulative printing (S706: Y), it is determined whether a number of printing pages of the data of the printing job is greater than or equal to a pre-set threshold number of pages (S707).

If the accumulative printing option confirm is not set (S705: N), the UI window to ask whether the accumulative printing function is to be used is not displayed for the user and it is determined whether the number of printing pages of the printing job is greater than or equal to the pre-set threshold number of pages (S707).

If the number of printing pages of the data of the printing job is greater than or equal to the pre-set threshold number of pages (S707: Y), it is determined whether there exists pre-stored data (S708). If there exists the pre-stored data (S709: Y), the data of the printing job and the pre-stored data are combined with each other and are printed altogether (S710). If there exists no pre-stored data (S709: N), the data of the printing job is printed (S711).

If the number of printing pages of the data of the printing job is less than the pre-set threshold number of pages (S707: N), the data is accumulated and stored (S712). It may be determined whether the number of printing pages of the accumulated data is greater than or equal to the threshold number of pages (S713). If the number of printing pages of the accumulated data is greater than or equal to the threshold number of printing pages (S713: Y), the accumulated data is printed (S714). If the number of printing pages of the accumulated data is less than the threshold number of pages (S713: N), the image forming apparatus 200 waits for a printing command from the print controlling terminal apparatus 100 and repeats the above-described operations.

The print controlling method of the print controlling terminal apparatus 100 and the image forming method of the image forming apparatus 200 according to an exemplary embodiment may program code and may be stored in various recording media. The program code may be stored in various recording media readable by a terminal apparatus, such as a RAM, a flash memory, a ROM, an EPROM, an EEPROM, a register, a hard disk, a removable disk, a memory card, a USB memory, and a CD-ROM.

Accordingly, a program may be installed so that the print controlling method and the image forming method can be executed in an apparatus to which such a recording medium is connected or in which such a recording medium is mounted.

According to an exemplary embodiment, it may be determined whether the accumulative printing is needed based on the ratio of the number of accumulated OPC revolutions to the number of accumulated output pages of the image forming apparatus 200, and the printing job is performed according to a result of the determining, so that the standard lifespan of the OPC drum can be met.

The UI to select whether the accumulative printing option is set may be provided so that user's convenience in setting options can be improved.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those of ordinary skill in the art.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An image forming method of an image forming apparatus, the image forming method comprising:
   receiving a job command to execute a printing job;
   determining whether accumulative printing is needed or not based on a ratio of a number of accumulated OPC revolutions to a number of accumulated output pages of the image forming apparatus;
   if it is determined that the accumulative printing is needed, accumulating and storing printing data of the printing job; and
   if a number of printing pages of entire printing data accumulated and stored is greater than or equal to a pre-set threshold number of pages, printing the entire printing data.

2. The image forming method as claimed in claim 1, wherein the determining comprises:
   calculating the ratio of the number of accumulated OPC revolutions to the number of accumulated output pages; and
   determining whether the accumulative printing is needed or not by comparing the ratio of the number of accumulated OPC revolutions to the number of accumulated output pages and a pre-set threshold value.

3. The image forming method as claimed in claim 2, wherein the determining comprises, if a number of printing pages of the printing job is greater than or equal to the pre-set threshold number of pages, determining that the accumulative printing is not needed.

4. The image forming method as claimed in claim 1, wherein the determining comprises, if an accumulative printing option is not set, determining that the accumulative printing is not needed.

5. The image forming method as claimed in claim 4, further comprising displaying a user interface window to set a printing option,
wherein the printing comprises performing the printing job reflecting the set printing option.

6. The image forming method as claimed in claim 5, wherein the user interface window comprises a first region to select whether an accumulative printing option is set or not and a second region to select whether use of an accumulative printing function is notified or not prior to performing the printing job.

7. The image forming method as claimed in claim 1, further comprising:
if it is determined that the accumulative printing is needed, comparing a number of printing pages of the printing data of the printing job and the pre-set threshold number of pages;
if the number of printing pages of the printing job is less than the pre-set threshold number of pages, accumulating and storing the printing data of the printing job;
if the number of printing pages of the printing job is greater than or equal to the pre-set threshold number of pages, determining whether there exists pre-stored printing data or not; and
if there exists the pre-stored printing data, combining the printing data of the printing job and the pre-stored printing data and printing the combined printing data, and, if there exists no pre-stored printing data, printing the printing data of the printing job.

8. The image forming method as claimed in claim 1, further comprising, if it is determined that the accumulative printing is needed, displaying that the accumulative printing is progressed.

9. The image forming method as claimed in claim 1, wherein the printing comprises, if a pre-set printing standby time elapses in a state that the number of printing pages of the entire printing data accumulated and stored is less than the pre-set threshold number of pages, printing the entire printing data.

10. The image forming method as claimed in claim 1, wherein the printing job is at least one of a job transmitted from a print controlling terminal apparatus connected to the image forming apparatus, a job on scan data generated by a scan unit of the image forming apparatus, and a fax reception job received at a fax unit of the image forming apparatus.

11. An image forming apparatus comprising:
a user interface unit which receives a job command to execute a printing job;
a determination unit which determines whether accumulative printing is needed based on a ratio of a number of accumulated OPC revolutions to a number of accumulated output pages of the image forming apparatus;
a storage unit which, if it is determined that the accumulative printing is needed, stores data of the printing job; and
an image forming unit which, if a number of printing pages of entire data accumulated and stored is greater than or equal to a pre-set threshold number of pages, prints the entire data.

12. The image forming apparatus as claimed in claim 11, wherein the determination unit calculates the ratio of the number of accumulated OPC revolutions to the number of accumulated output pages, and determines whether the accumulative printing is needed by comparing the ratio of the number of accumulated OPC revolutions to the number of accumulated output pages and a pre-set threshold value.

13. The image forming apparatus as claimed in claim 12, wherein, if a number of printing pages of the printing job is greater than or equal to the pre-set threshold number of pages, the determination unit determines that the accumulative printing is not needed.

14. The image forming apparatus as claimed in claim 11, wherein, if an accumulative printing option is not set, the determination unit determines that the accumulative printing is not needed.

15. The image forming apparatus as claimed in claim 14, further comprising a user interface unit which displays a user interface window to set a printing option,
wherein the image forming unit performs the printing job reflecting the set printing option.

16. The image forming apparatus as claimed in claim 15, wherein a user interface window comprises a first region to select whether an accumulative printing option is set and a second region to select whether use of an accumulative printing function is notified prior to performing the printing job.

17. The image forming apparatus as claimed in claim 16, wherein, if it is determined that the accumulative printing is needed, the determination unit compares a number of printing pages of the printing data of the printing job and the pre-set threshold number of pages, and, if the number of printing pages of the printing job is greater than or equal to the pre-set threshold number of pages, the determination unit determines whether there exists pre-stored printing data,
wherein, if there exists the pre-stored printing data, the image forming unit combines the printing data of the printing job and the pre-stored printing data and prints the combined printing data, and, if there exists no pre-stored printing data, the image forming unit prints the printing data of the printing job,
wherein, if the number of printing pages of the printing job is less than the pre-set threshold number of pages, the storage unit accumulates and stores the printing data of the printing job.

18. The image forming apparatus as claimed in claim 16, wherein, if it is determined that the accumulative printing is needed, the user interface unit displays that the accumulative printing is progressed.

19. The image forming apparatus as claimed in claim 11, wherein, if a pre-set printing standby time elapses in a state that the number of printing pages of the entire printing data accumulated and stored is less than the pre-set threshold number of pages, the image forming unit prints the entire printing data.

20. A recording medium on which a program code to perform an image forming method of an image forming apparatus is recorded, the image forming method comprising:
receiving a job command to execute a printing job;
determining whether accumulative printing is needed or not based on a ratio of a number of accumulated OPC revolutions to a number of accumulated output pages of the image forming apparatus;
if it is determined that the accumulative printing is needed, storing the printing job; and
if a number of printing pages of printing data of the printing job is greater than or equal to a pre-set threshold number of pages, printing the printing data of the printing job.

* * * * *

UNITED STATES PATENT AND TRADEMARK OFFICE
CERTIFICATE OF CORRECTION

| | | |
|---|---|---|
| PATENT NO. | : 8,964,193 B2 | Page 1 of 1 |
| APPLICATION NO. | : 13/557870 | |
| DATED | : February 24, 2015 | |
| INVENTOR(S) | : Jin-Myung Joo et al. | |

It is certified that error appears in the above-identified patent and that said Letters Patent is hereby corrected as shown below:

Title page

Item (54) Title, Line 4

After "OF" insert --PRINT--.

Specification

Column 1, Line 4

After "OF" insert --PRINT--.

Signed and Sealed this
Eighth Day of December, 2015

Michelle K. Lee
*Director of the United States Patent and Trademark Office*